Aug. 9, 1932.  R. L. CLAUSE  1,871,156
PROCESS FOR MAKING PLATE GLASS
Filed July 25, 1929  3 Sheets-Sheet 1
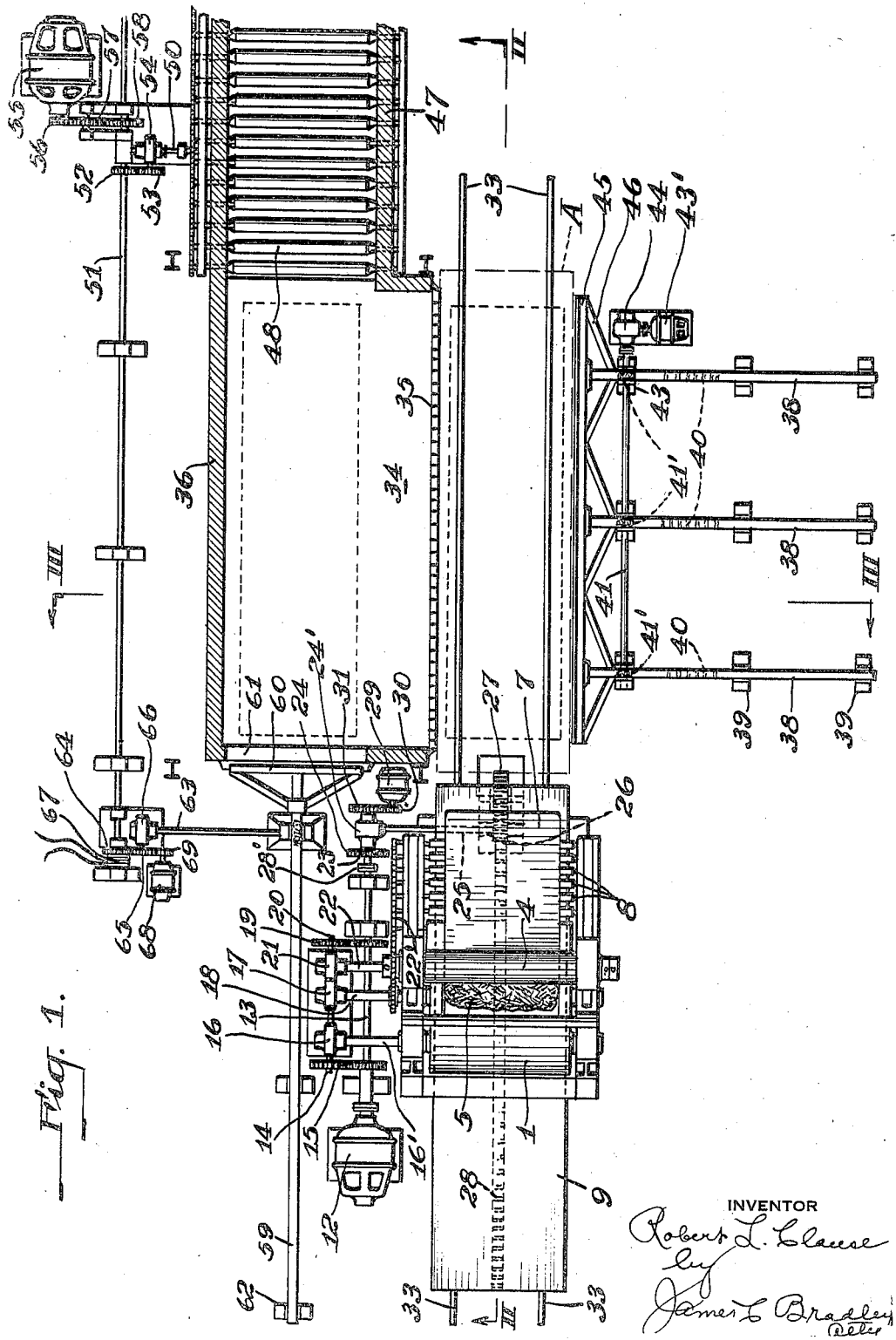
INVENTOR
Robert L. Clause
by
James L. Bradley

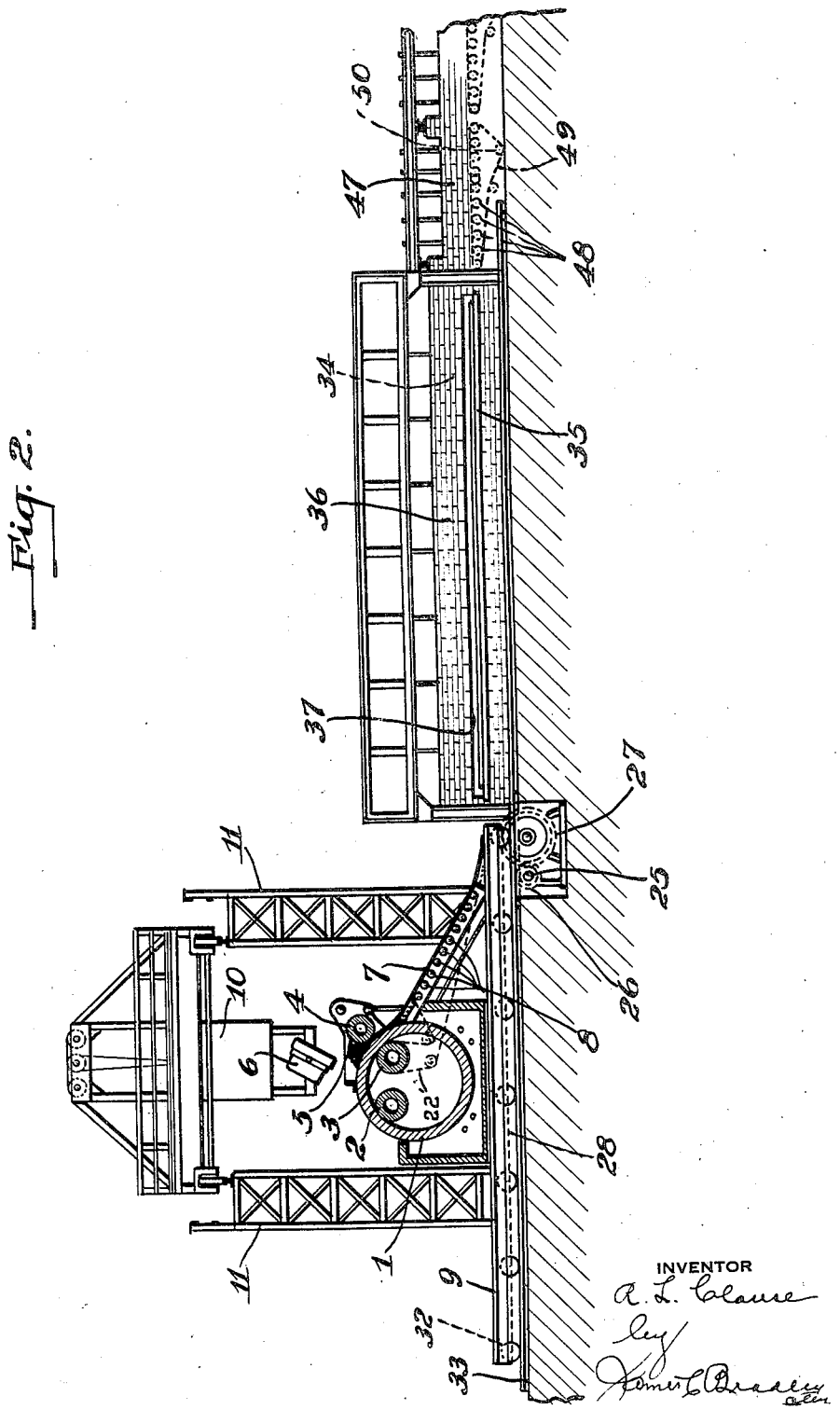

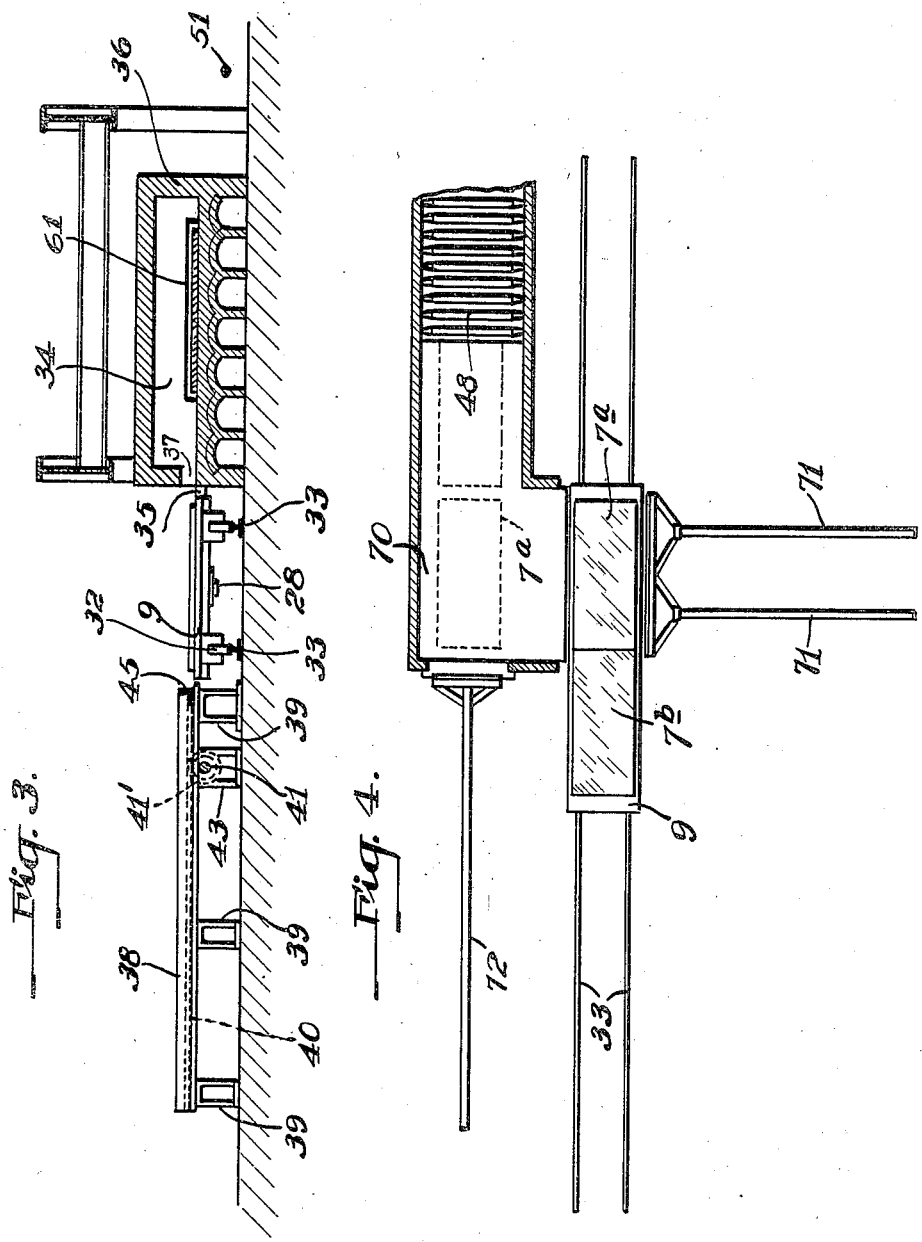

Patented Aug. 9, 1932

1,871,156

UNITED STATES PATENT OFFICE

ROBERT L. CLAUSE, OF SEWICKLEY, PENNSYLVANIA, ASSIGNOR TO PITTSBURGH PLATE GLASS COMPANY, A CORPORATION OF PENNSYLVANIA

PROCESS FOR MAKING PLATE GLASS

Application filed July 25, 1929. Serial No. 380,919.

The invention relates to a process for making plate glass by an intermittent rolling or casting operation. It has for its objects the provision of an improved process whereby a sheet of large area may be rolled and annealed in such manner that the glass is relatively smooth and flat, and is of any desired degree of thinness suitable for grinding. Briefly stated this is accomplished by rolling the glass onto a relatively long narrow table of metal, where the sheet remains only long enough to stiffen so that it may be stowed, stowing it laterally into an oven where it stiffens still further to a point where it may be stowed endwise, stowing it endwise into a roller leer, and then reheating the glass till it is again plastic so that it can flatten as it moves through the leer. This procedure permits the handling of large sheets of thin glass. The sheet will stiffen sufficiently on the table to permit sidewise stowing before developing fire cracks. In the oven the sheet can harden on the clay floor to any desired degree so that it is feasible to stow it endwise into the leer. This sheet is smooth and of uniform thickness, but is not flat as it warps in hardening in the oven. The leer, therefore, is of sufficient temperature at its entrance end to resoften the sheet. The sheet as thus resoftened will readily flatten as it moves over the roller leer, as is well known in the art. Certain embodiments of the invention are illustrated in the accompanying drawings, wherein:

Figure 1 is a plan view, partially in section. Fig. 2 is a vertical section on the line II—II of Fig. 1. Fig. 3 is a section on the line III—III of Fig. 1. And Fig. 4 is a plan view showing a modification.

The apparatus preferably employed for rolling out the sheet is preferably that shown and described in the Showers Patent No. 1,579,666, although any other form of rolling apparatus may be employed, if desired. This apparatus comprises a large ring roll 1 supported upon a pair of drive shafts 2, 3, and a water cooled sizing roll 4 in opposition to the roll 1. A body of glass 5 from the pot 6 is poured between the rolls and rolled out into the sheet 7, passing over the set of rolls 8 which constitute a runway and onto the receiving table 9, such receiving table moving to the right from the position shown in Fig. 2 during the rolling operation. The pot 6 is brought to the pouring position shown by means of the crane 10 supported upon a series of pairs of columns 11.

The rolls 1 and 4 and the shafts 2 and 3 are driven from the electric motor 12 which has a laterally extending shaft 13 (Fig. 1). This shaft drives a countershaft 14 through the intermediary of the chain 15 and suitable sprockets on the two shafts. The shaft 14 in turn operates through a worm reducer in the casing 16 to drive the tumbler shaft 16' which is connected to the end of the shaft 2. Similarly the shaft 14 operates through the worm reducer in the casing 17 to drive the tumbler shaft 18 connected to the end of the shaft 3. The rotation of these shafts causes a rotation of the ring roll 1 which is suspended thereon. The sizing roll 4 is driven from the shaft 13 by means of the chain 19 passing around suitable sprockets on the shaft 14 and on the shaft 20, such latter shaft operating through a reducer in the casing 21 to drive the tumbler shaft 22 which is connected to the end of the roll 4. The rolls 8 constituting the major portion of the runway are driven by means of a sprocket chain 22' passing around suitable sprockets on the ends of the roll shafts and around a sprocket on the shaft of the roll 4.

The shaft 13 also serves as the driving means for moving the table 9 forward during the sheet forming operation. Such shaft carries on its right hand end a pinion 23 meshing with a gear 24, such gear being carried by a shaft which operates through reducing gearing in the casing 24' to drive a transverse shaft 25 extending beneath the table. This shaft 25 is provided with a pinion 26 engaging the gear 27 which in turn engages a rack 28 secured along the bottom of the table. A magnetic clutch 28' is also preferably employed between the shaft 13 and the pinion 23 so that when this clutch is released, the sheet forming rolls may be rotated without moving the table 9 forward.

In order to move the table 9 backward, that is, from right to left (Fig. 2), a motor 29 is preferably provided, such being geared to the shaft carrying the gear 24 by means of the pinion 30 and gear 31. By means of this motor the table may be run backward, the clutch 28' being disconnected at this time so that the sheet forming rolls are not operated.

The table 9 is preferably mounted upon wheels 32 riding upon the track 33 which extends to the right so that during the casting operation the table may be moved completely from beneath the rolling apparatus and runway until it occupies the position indicated in dotted lines marked A in Fig. 1. At this time the table lies alongside the oven 34, the floor of the oven being at substantially the level of the top of the table. A series of fingers 35 lying between the floor of the oven and the top of the table act as a bridge to support the sheet when it is moved from the top of the table into the oven by the stowing apparatus, as later described. The oven walls 36 are preferably of brick and form an enclosure on these sides, the wall next to the table being slotted, as indicated at 37, in order to permit the glass sheet to pass therethrough and also to permit the passage of the stowing apparatus by means of which the sheet is shoved from the table into the oven. The floor of the oven is preferably of clay or other non-metallic refractory material on which the glass sheet may rest while it is stiffening up without developing fire cracks. The table 9 on which the sheet is deposited from the rolling apparatus is of metal, such as cast iron or cast steel, on which the glass quickly stiffens and from which it must be removed before the lower surface is so chilled as to develop fire cracks.

The means for stowing the sheet from the table 9 into the oven comprises the reciprocating bars 38, 38, 38, each slidably mounted upon the stands 39 and provided upon its lower side with a rack 40. A shaft 41 extends transversely of the bars and is provided with pinions 41, 41, 41 engaging the racks, the shaft being suitably journalled in a series of stands 43. The shaft 41 is driven from the motor 43' through suitable worm gear reducing mechanism in the casing 44. The bars are connected at their front ends by means of an angle 45 (Fig. 3) braced from the bars by means of the diagonal members 46.

Communicating with the front end of the oven is a roller leer 47 provided with a series of transverse driven rolls 48. These rolls are provided at their ends with sprockets around which pass the chains 49. These chains are driven from transverse shafts 50 provided with sprockets engaging the chains and these shafts 50 are driven from the main drive shaft 51 of the leer which extends the entire length thereof. The drive between the shaft 51 and cross shaft 50 comprises the gears 52, 53 and suitable worm reduction gearing in the casing 54. The shaft 51 is driven from the motor 55 through the intermediary of suitable gears 56, 57 and 58, as indicated in Fig. 1.

The shaft 51 also serves as the power means for advancing the stowing tool for moving the sheet endwise from the oven 34 onto the rollers 48 of the roller leer. The stowing device comprises a bar 59 provided with a head 60 working through a slot 61 at the rear end of the oven. This bar is slidably mounted in suitable stands 62 and is provided upon its lower side with a rack which is engaged by a pinion carried by the cross shaft 63. This cross shaft is driven from the leer drive shaft 51 through the intermediary of the gears 64 and 65 and suitable worm reducing mechanism in the casing 66. The gear 64 is loose upon the shaft 51 but may be connected thereto by means of a magnetic clutch 67 so that when this clutch is energized, the shaft 63 is driven and the stowing tool is moved forward to push the sheet of glass from the oven into the roller leer. When the stowing tool is not being used, the clutch 67 is released so that the leer drive shaft 51 is no longer operative to move the stowing tool. The gear between the shafts 51 and 63 is so proportioned that the forward movement of the stowing tool is equal to the peripheral speed of the leer rolls 48. In order to withdraw the stowing tool, a separate motor 68 is employed, such motor having its drive shaft provided with a pinion 69 meshing with the gear 65.

When the operation is started, the parts occupy the position shown in Figs. 1, 2 and 3, the rolls 1 and 2 being at such time driven from the motor 12. A pot of glass is now deposited between the rollers 1 and 4, and the sheet 7 is rolled out at a relatively high speed onto the runway 8. Just before the forward end of this sheet reaches the table 9, the magnetic clutch 28' is energized to bring the gearing for moving the table into operation. The gearing is so proportioned that the table moves forward at the same rate of speed as the speed of formation of the sheet. The movement of the table continues until the entire body of glass is exhausted from the space between the rollers and the sheet deposited upon the table. The table has now moved to the position indicated at A in dotted lines in Fig. 1. The speed of rolling of the sheet and the forward movement of the table is preferably at a relatively high rate of speed, preferably from 30 to 50 feet per minute, as this high speed of sheet formation has been found to improve the quality of the product and permit the casting of relatively thin glass, in some cases only slightly over one-eighth of an inch. The glass is allowed to remain on the table only a period sufficient to permit the glass to stiffen so that it can be stowed from the table into the oven. If the sheet is allowed to remain too long upon the table, the lower surface is injured by the formation of fire cracks. The pressure necessary to move the sheet is, however, distributed over a relatively large area due to the fact that the side of the sheet is exposed to the action of the stowing head so that the sheet can be moved from the table much more quickly than if the stowing action were endwise of the sheet.

After the sheet is pushed into the oven 34, it is allowed to remain there until the sheet cools and stiffens so that it can be stowed endwise into the roller leer. The lower surface of the sheet is not impaired in the oven, since the floor of the oven is of non-metallic refractory material, such as clay, whose heat-absorbing properties are poor, so that there is no tendency to develop fire cracks in the sheet. The sheet as thus hardened in the oven is, however, somewhat warped so that flattening is required after the sheet is removed from the oven. The sheet is removed from the oven by means of the stowing bar 59, which is made effective by operating the magnetic clutch 67 so that the bar moves forward at a rate of speed which is the same as the peripheral speed of the leer rollers 48. The temperature of the entrance end of the roller leer is such that the glass sheet is resoftened and as it moves through the roller leer it is gradually straightened out until it is perfectly flat, this being characteristic of a roller leer operation when the sheet is introduced into the leer in plastic condition. As the sheet progresses still farther through the leer at a decreasing temperature, it hardens up and then cools down through the annealing range and finally becomes cooled to a temperature at which it may be removed from the leer and cut.

Fig. 4 illustrates diagrammatically a modification in which the glass sheet instead of being handled as a unit is cut into two sections, which are handled separately. The apparatus and method of operation are in other particulars similar to that described in connection with Figs. 1 to 3. Referring to the drawings, the sheet is shown as cut on the table 9 into two sections 7a and 7b and the table occupies the position shown at the end of the sheet forming operation with the forward end of such table opposite the rear end of the oven 70. The stowing bars 71 are operated to move the section 7a of the sheet into the oven, after which the table is moved forward to bring the section 7b opposite the end of the oven. The stowing tool 72 is then operated to move the section 7a into the forward end of the oven 70, after which the section 7b of the sheet may be moved into the oven by the stowing tool 71. After the sheets have sufficiently hardened in the oven, the stowing bar 72 is operated to push the sheets into the roller leer 47, the front end of the sheet 7b engaging the rear end of the sheet 7a and serving to move it forward. In some cases it is desirable to reduce the size of the sheet in this manner by dividing it up into two parts preliminary to placing it in the oven.

What I claim is:

A process for making sheet glass, which consists in rolling out a sheet of glass of greater length than width and depositing it upon a flat metal surface, stowing the sheet sideways therefrom onto a flat non-metallic surface and permitting it to cool and harden to a degree such that it may be stowed endwise of the sheet, stowing the sheet endwise from such last surface into a roller leer, and reheating, flattening and annealing the sheet in said leer.

In testimony whereof I have hereunto subscribed my name this 28th day of June, 1929.

ROBERT L. CLAUSE.